Patented Sept. 22, 1936

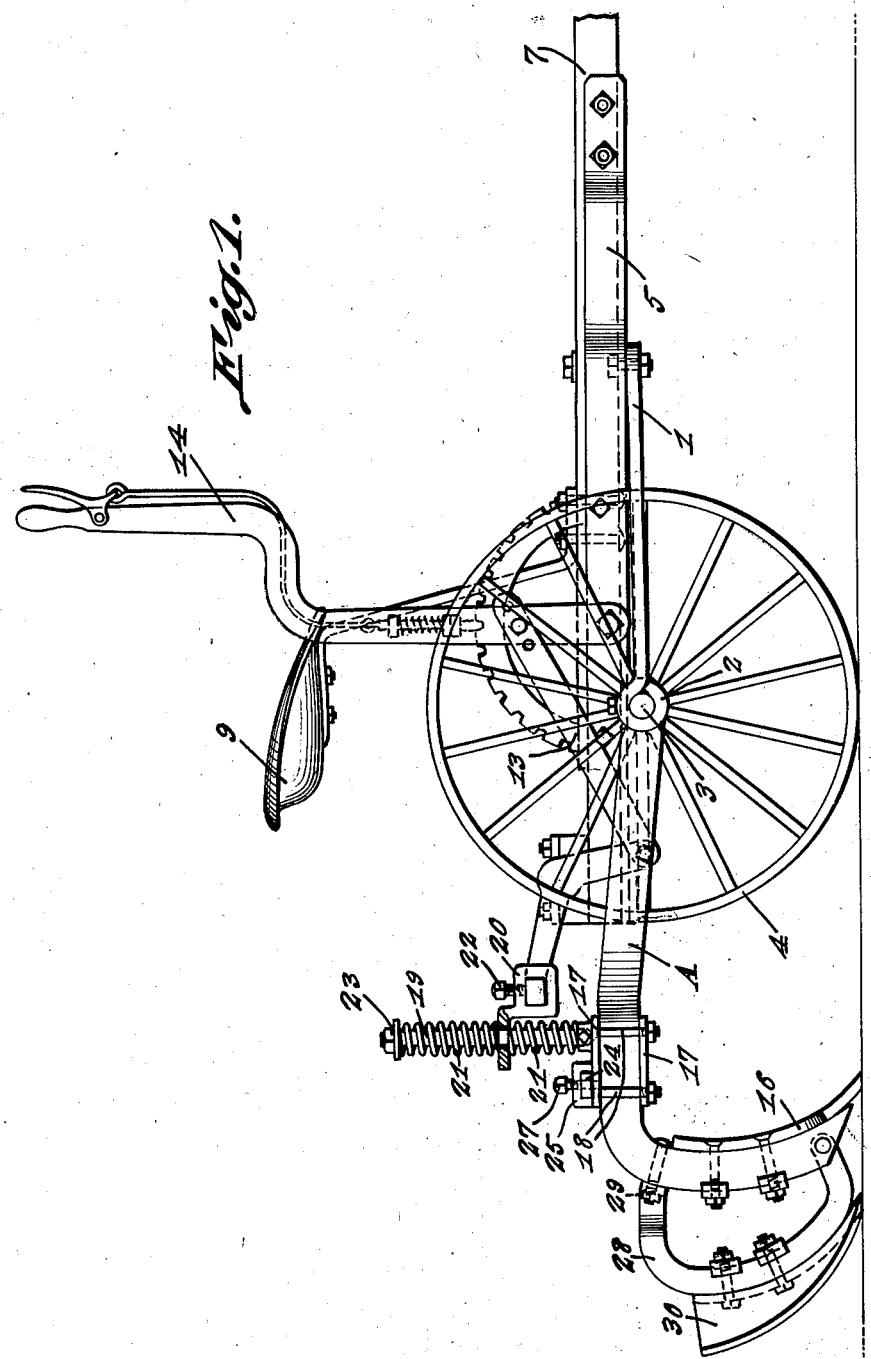

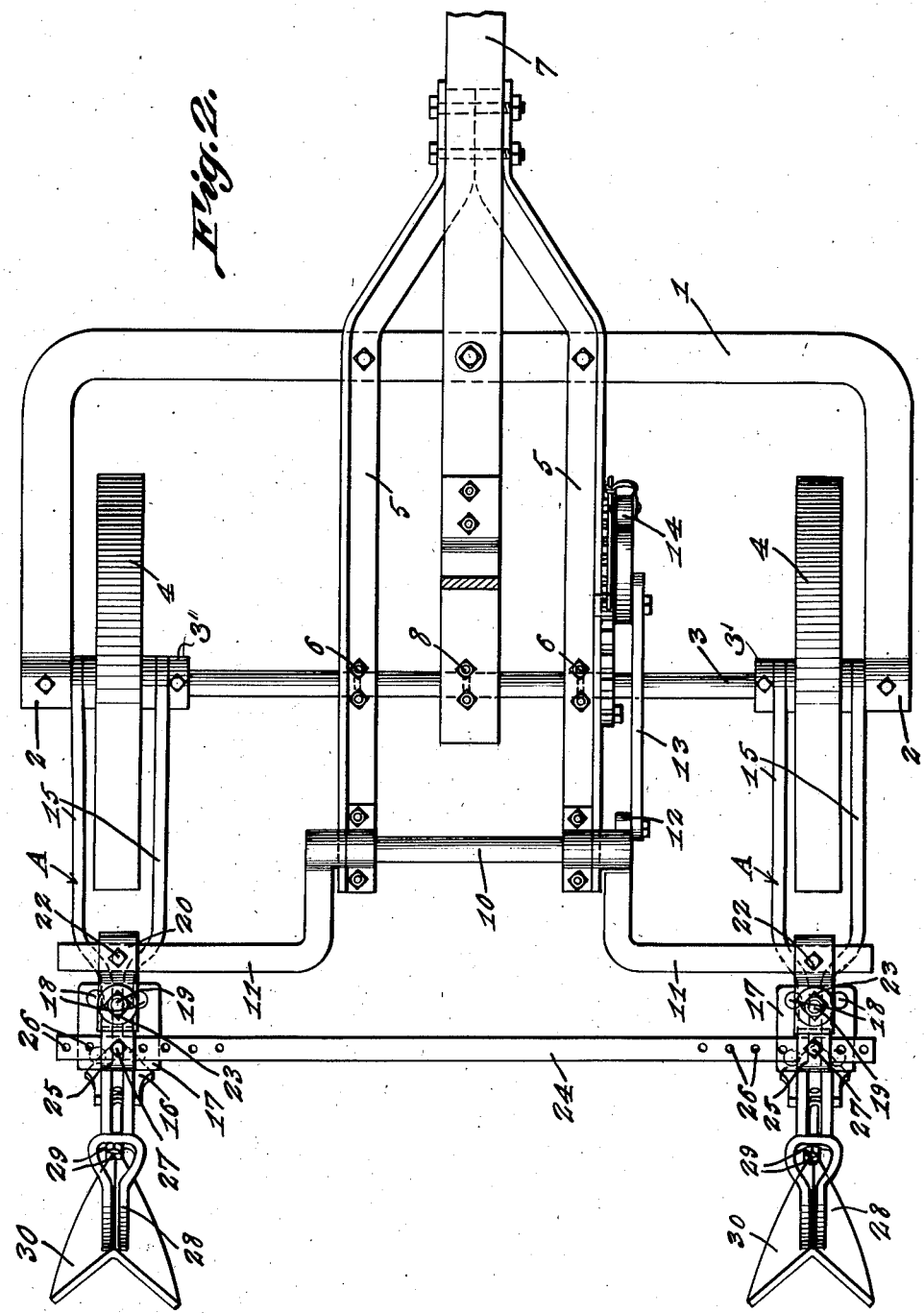

2,055,388

UNITED STATES PATENT OFFICE 2,055,388

GROUND MARKING MACHINE

Luther Rhodes, Montrose, Colo.

Application December 6, 1929, Serial No. 412,198
Renewed March 7, 1932

1 Claim. (Cl. 97—55)

This invention relates to an agricultural implement, the general object of the invention being to provide an implement for marking ground for irrigation purposes and the like, with means whereby the marking plows can be raised and lowered by a person on the seat of the implement, such means including spring means which normally press the plows into the ground and which also permit the plows to rise over obstructions when striking the same.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation with parts in section, of the implement.

Figure 2 is a plan view thereof.

In these views, the numeral 1 indicates a yoke-shaped member, the ends of which are bent to form the bearings 2 for the axle 3 which supports the ground wheels 4. A pair of bars 5 is fastened in spaced relation adjacent their front ends to the member 1 and carry the U bolts 6 adjacent their rear ends which pass around the axle 3. The members 5 are preferably of channel iron and have their front ends converging to form a support for the tongue 7 which is bolted to the front ends of the members 5 and to the central part of the frame 1, the rear end of the tongue carrying a U bolt 8 which passes around the axle. The usual seat 9 is supported from the tongue.

A shaft 10 is journaled in the rear parts of the members 5 and said shaft is formed with the rearwardly extending cranks 11. At the junction of one crank with the shaft 10, a depending part 12 is provided which is connected by a link 13 with a hand lever 14, so that by manipulating this hand lever, the shaft can be rocked as desired.

A beam A is pivotally supported from each end of the axle, this beam being composed of the two members 15 which have their front ends spaced apart to receive portion of the wheel 4 between them and the rear parts of the two members are bent toward each other and then extend downwardly to receive the plow or bull tongue 16. Upper and lower cross plates 17 are connected with the rear portions of the beams by the bolts 18 and an upright 19 is carried by the upper cross plate of each beam. A socketed bracket 20 is slidably arranged on each upright and is arranged between the upper and lower springs 21 on said cross upright. The ends of the cranks 11 of the shaft 10 extend within the sockets of the brackets 20 and the sockets are held in adjusted position on the cranks by the set screws 22. The tension of the springs 21 can be adjusted by a nut 23 on the upper end of each upright. A cross bar 24 passes through the sockets 25 on the upper cross plates 17 and has a plurality of holes 26 at each end thereof, any one of which is adapted to receive a set screw 27 carried by each socket 25. A bowed member 28 is fastened to the plow carrying portion of each beam by the bolts 29 and these bowed members carry the plows 30.

From the foregoing it will be seen that the crank 10 can be rocked by the operator in the seat 9 by manipulating the lever 14 and as the cranks 11 are yieldingly connected with the rear portions of the plow beams, this rocking movement of the lever will raise and lower the beams. It will also be seen that the upper springs tend to press the plows into the soil, but will permit the plows to ride over stones or other obstructions when they strike the same. By adjusting the tension of the springs through means of the nuts 23, the plows can be set to penetrate the soil to any desired depth. As before stated, the implement is mainly designed to mark the soil for irrigating ditches or the like, though, of course, it can be used for other purposes where it is desired to mark the soil. It will also be seen that the plows can be adjusted toward and away from each other to make the marks the desired distances apart by adjusting the bar 24 and the collars 3' on the axle 3. It being understood that the wheels 4 are adjusted along with the plow beams on the axle that the plows will always track the wheels.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A ground marking machine comprising a U-shaped frame, bearings carried by the ends of the frame, an axle mounted in the bearings, ground wheels journalled on the axle, bracket beams journalled on the axle at opposite sides of the wheels, collars adjustable on the axles and engaging the beams, markers carried by the beams, brackets on the beams adjacent the markers, an upright on each bracket, a crank shaft journalled on the frame, an operating means for the crank shaft, means adjustably and slidably connecting the crank shaft to the uprights, cushion means on the uprights and engaging the first named means, and a connecting element adjustably secured to the brackets and cooperating with the collars for adjusting the beams toward and from each other and endwise of the axle along with the wheels and for maintaining the beams and wheels in any of their adjusted positions.

LUTHER RHODES.